Sept. 27, 1932. R. P. F. LIDDELL 1,879,355
FILTER MAKING MACHINE
Filed Dec. 4, 1929 3 Sheets-Sheet 1
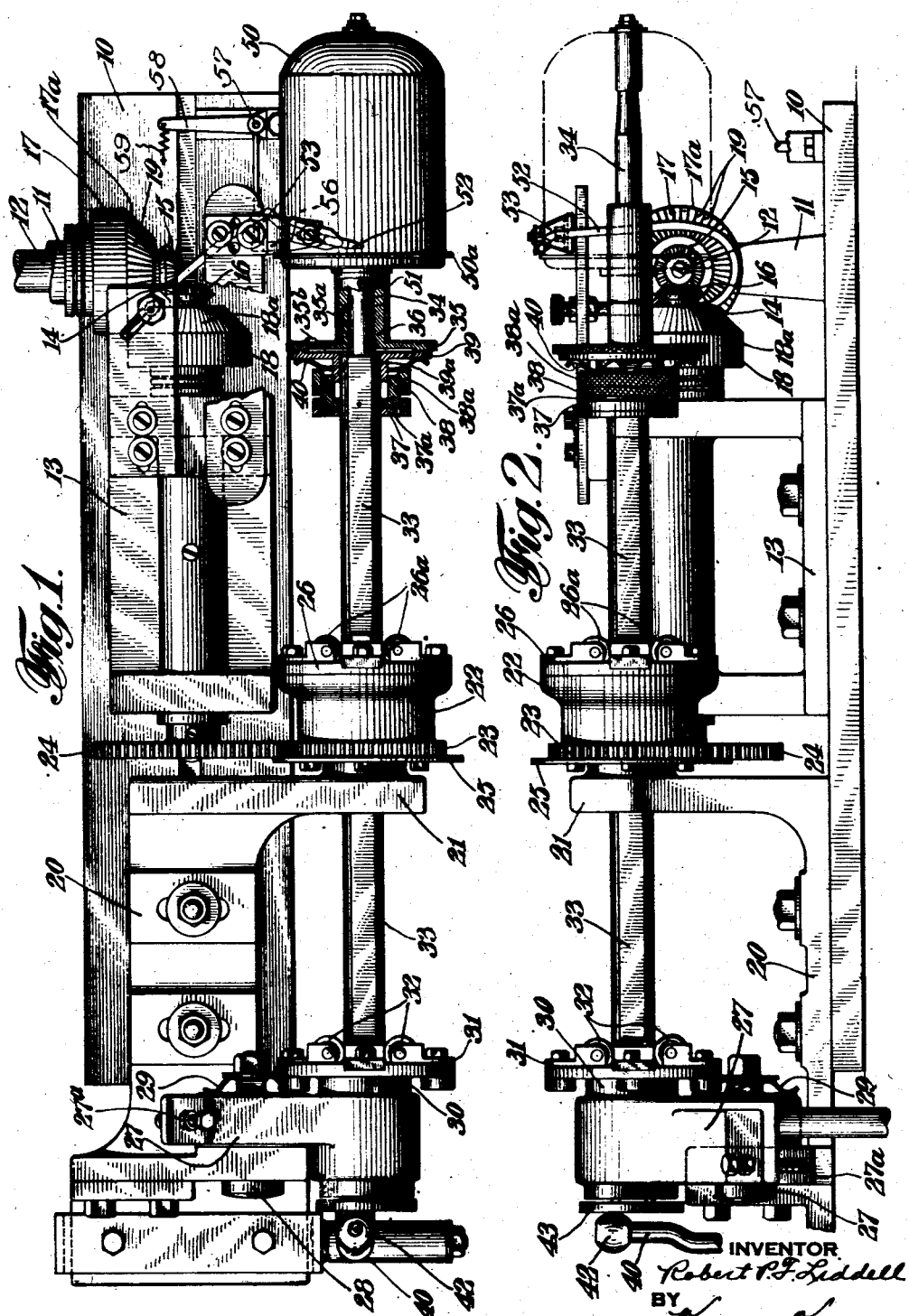
INVENTOR
Robert P. F. Liddell
BY Kenyon & Kenyon
ATTORNEYS.

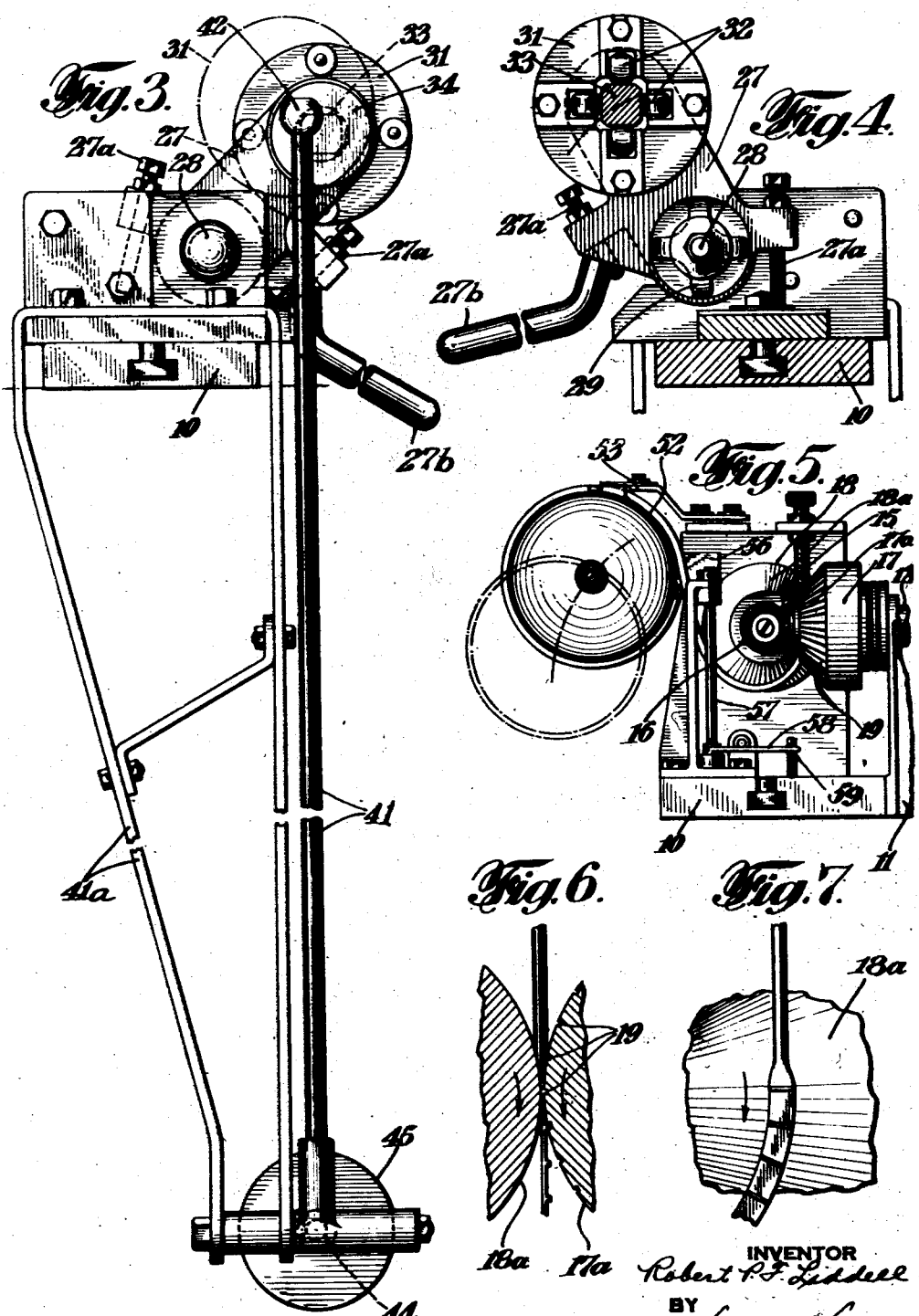

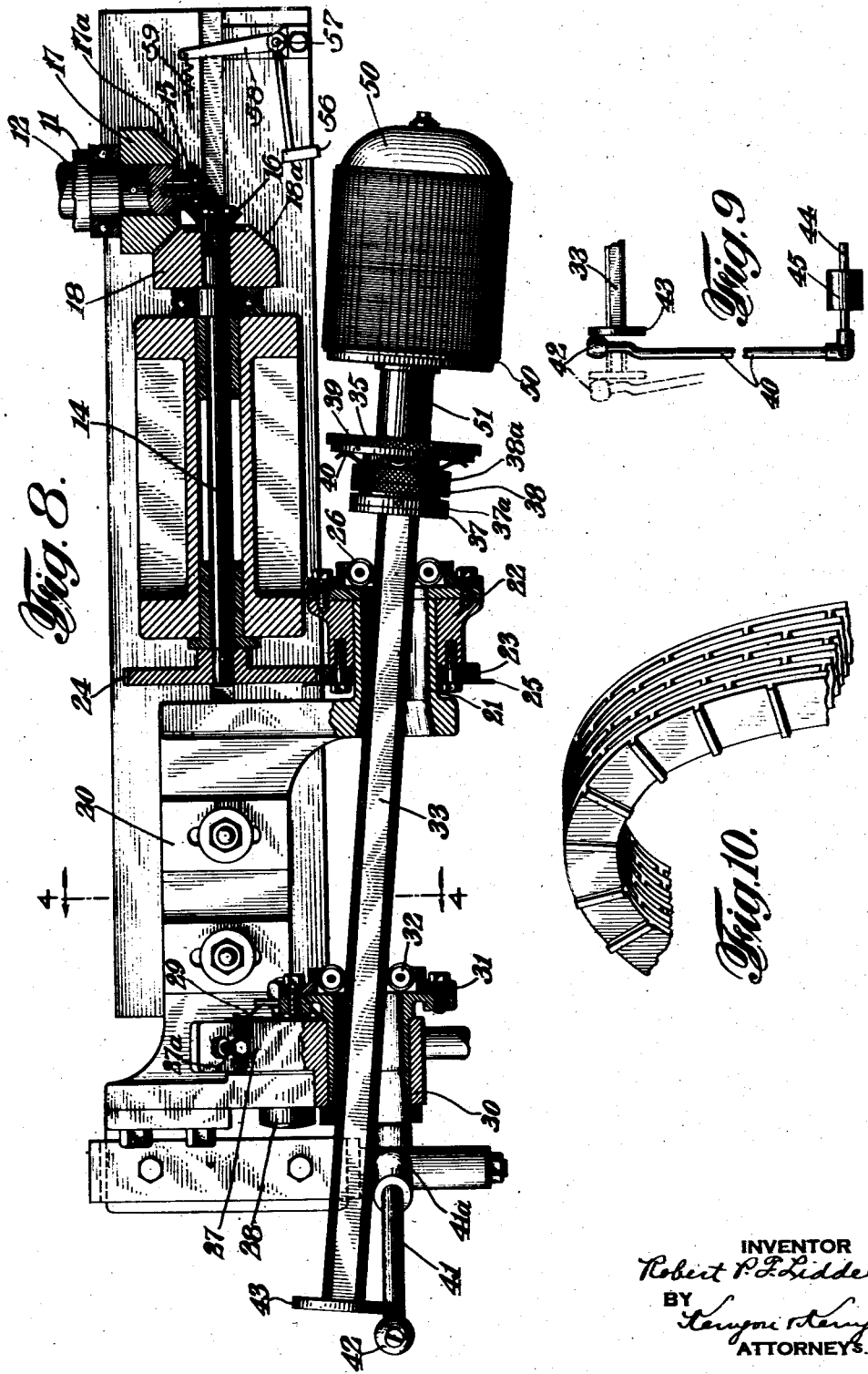

Patented Sept. 27, 1932

1,879,355

UNITED STATES PATENT OFFICE

ROBERT P. F. LIDDELL, OF MORRIS TOWNSHIP, MORRIS COUNTY, NEW JERSEY, ASSIGNOR TO MOTOR IMPROVEMENTS, INC., OF NEWARK, NEW JERSEY, A CORPORATION OF DELAWARE

FILTER MAKING MACHINE

Application filed December 4, 1929. Serial No. 411,463.

This invention relates to wire bending machines and has for an object a process of and a machine for manufacturing filter units of the type disclosed in the applications of R. P. F. Liddell, Serial No. 368,381, filed June 4, 1929, and Ser. No. 395,848, filed Sept. 28, 1929.

A machine for manufacturing such filter units comprises means for converting a straight round wire into a thin flat ribbon having a definite curvature such that it naturally assumes the form of a helix with its faces in abutting relationship. During the operation of converting the round wire into a flat ribbon ribs are formed on one face of the ribbon for spacing the adjacent turns thereof to form filtering slots. The machine also includes means for arranging the formed ribbon around a cylindrical support to which it may be later attached, or from which it may be removed, as desired. This machine easily and quickly and at a minimum of expense produces the filtering unit which is the subject matter of the application above referred to.

Other objects, novel features and advantages of this invention will be apparent from the following specification and accompanying drawings, wherein:

Fig. 1 is a plan view of a machine embodying the invention.

Fig. 2 is a front elevation of such machine.

Fig. 3 is an end view from the left of Fig. 1.

Fig. 4 is a section on the line 4—4 of Fig. 8.

Fig. 5 is an end view from the right of Fig. 1.

Figs. 6 and 7 are detail views of the converting rollers.

Fig. 8 is a section on the line 8—8 of Fig. 2.

Fig. 9 is a reduced partial front elevation, and

Fig. 10 is a fragmentary perspective view of a filter produced by the machine.

In the machine herein disclosed, a base 10 supports a bracket 11 in which is journalled a shaft 12. A support 13 is adjustably mounted on the base 10 and has journalled therein a shaft 14, the axis of which is perpendicular to the axis of the shaft 12. The shaft 12 is provided with a bevel gear 15 which meshes with a bevel gear 16 with which the shaft 14 is provided. Rollers 17 and 18 are mounted on the shafts 12 and 14 respectively and have co-acting conical surfaces $17^a$ and $18^a$. One of the rollers, in this instance the roller 17, is provided with a plurality of radial slots 19. The shaft 12 constitutes the drive shaft of the machine and is rotated by any suitable source of power.

A second support 20 is adjustably mounted on the base 10 and is provided with a tubular portion 21 on which is rotatably mounted a substantially cylindrical head 22. A gear wheel 23 is attached to the left face of the head 22 by suitable bolts and meshes with a gear wheel 24 mounted on the shaft 14. Axial movement of the head 22 to the right is prevented by a disk 25 which is attached to the head by the same bolts which fasten the gear 23 thereto, the disk 25 being of greater diameter than the gear wheel 23 and thus overlying the gear wheel 24. A collar 26 is fastened to the right face of the head 22 by suitable bolts and four rollers $26^a$ are journalled in the collar. The rollers are arranged to define a substantially square aperture to receive a shaft later to be described.

An arm 27 is pivotally mounted on a bolt 28 which is screwed into the support 20. A resilient friction member 29 is mounted on the bolt 28 and bears against the arm 27 to hold the same in any position to which it may be moved. A head 30 is journalled in the free end of the arm 27 and to the front face of this head a collar 31 is attached by means of suitable bolts. Four rollers 32 are journalled in the collar 31 and are arranged to define a square aperture. A bolt $33^a$ is threaded through a projection formed on the arm 27 and is adapted to engage the support 20 to limit swinging movement of the arm 27 in one direction.

A square shaft 33 extends through the heads 22 and 30 and is engaged on its various faces by the rollers 26 and 32. The engagement of the rollers 26 with the faces of the shaft 33 is effective to cause rotation of the shaft 33 with the head 22 and permit axial movement of the shaft. In like manner, the engagement of the rollers 32 with the faces of the square shaft 33 causes rotation of the head 30. This arrangement of rollers and shafts permits the latter to be moved between the positions shown in Fig. 1 and Fig. 8 by oscillation of the arm 27, the interiors of the arm 27 and portion 21 being tapered to permit such movement of the shaft.

At one end the shaft 33 is provided with a mandrel 34, which is rigidly attached to the shaft. A friction disk 35 is rotatably mounted on the shaft 33 and is provided with a hub 36 having a groove extending parallel to the shaft and in which is arranged one portion of a spring 35$^a$, the other portion of which is held by the bolt 35$^b$. A collar 37 is rigidly attached to the shaft 33 and is provided with a hollow hub 37$^a$ on which are threaded two knurled rings 38 and 38$^a$. A second friction plate 39 is mounted on the shaft and has a hub 39$^a$ extending into the recess in the hub of said collar. A circular resilient member 40 is interposed between the second friction plate and the knurled ring and exerts pressure on the second friction plate, tending to force it against the first friction plate.

A lever 41 is pivotally supported from the lower end of a bracket 41$^a$ depending from the left end of the base 10. The upper end of the lever 41 is provided with a roller 42, which engages a disk 43 arranged at the left end of the shaft 33. The lever 41 is provided with a perpendicular arm 44 on which is adjustably supported a weight 45. This lever tends to hold the shaft 33 to the right and opposes movement thereof to the left.

In the manufacture of a filter, such as that disclosed in applicant's co-pending applications, Serial Nos. 368,381 and 395,848 a drum 50 which constitutes a part of the finished filter element is mounted on the right end of the shaft 33. This drum is provided at one end with a flange 50$^a$ and also with a tubular extension 51, which surrounds the mandrel 34 and is frictionally engaged by the spring 35$^a$, to cause rotation therewith. Round wire is caused to pass between the co-acting faces of the rollers 17 and 18 and is converted into a thin ribbon having a definite curvature dependent upon the circumference of the rollers, transverse ribs being formed on one face due to the provision of the grooves 19. The ribbon thus formed is transferred to the drum 50 through a tubular guide 52 having the same curvature as the ribbon. The curvature of the ribbon is such that it naturally forms itself into turns having the wide faces perpendicular to the axis of the turns. A finger 56 is carried by a vertical shaft 57 at the lower end of which is provided an arm 58, the free end of which is connected to one end of a spring 59, the other end of which is connected to a post on the plate 10. The finger 56 projects nearly into contact with the drum 50. The guide tube 52 is carried by a bracket 53 mounted on the head 10 and delivers the ribbon on edge to the drum 50 which is rotated at the proper speed to take up the ribbon and the finger 56 engages the last turn of ribbon on the drum, thus compressing the turns between it and the flange 50$^a$. The end of the ribbon engages the flange 50$^a$ and is suitably connected thereto. As the ribbon is wound on the drum the shaft 33 is moved to the left against the action of the weight 44 due to the increase of turns between the finger and the flange, the turns being thereby held in contact. After the drum has been filled, the machine is stopped and the ribbon cut and its end fixed to the drum 50 in any suitable manner. The arm 27 is then swung by means of the handle 27$^b$ into the position shown in Fig. 8, thus moving the helix away from the finger 56 sufficiently to disengage the helix from the finger and permit the removal of the drum from the mandrel. An empty drum is then placed on the mandrel and the shaft 33 is returned to the position shown in Fig. 1 and the operation repeated.

The shaft 33 is driven from the shaft 14 and the drum is caused to rotate sufficiently fast to wind up the ribbon as fast as it is delivered by the rollers. The shaft may rotate a trifle faster than is required in which event, the mandrel and drum lag, such action being permitted by the friction plates provided for that purpose. The ribbon is laid on the drum on edge with its wide dimension transverse to the axis of the drum and forms a helix having its turns slightly spaced by reason of the transverse ribs. Fig. 9 shows a portion of the finished helix.

It is of course understood that various modifications may be made in the apparatus above described, without in any way departing from the spirit of the invention as defined in the appended claims.

I claim:

1. In an apparatus of the character described, a pair of rollers having conical coacting surfaces, a rotatable and axially movable drum, guide means for delivering to said drum a ribbon discharged from said rollers, and means to engage said ribbon as it is wound on the drum to effect axial movement of said drum.

2. In an apparatus of the character described, a pair of rollers having conical coacting surfaces, a rotatable and axially movable drum, guide means for delivering to said drum a ribbon discharged from said rollers, means to engage said ribbon as it is wound on the drum to effect axial movement of said drum, and means to oppose axial movement of said drum.

3. In an apparatus of the character described, a pair of rollers having conical coacting surfaces, a rotatable and axially movable drum, guide means for delivering to said drum a ribbon discharged from said rollers, said rollers having provision for forming transverse ribs projecting from one face of said ribbon, and means for effecting axial movement of said drum as said ribbon is wound thereon.

4. In an apparatus of the character described, a pair of rollers having conical co-acting surfaces, a rotatable and axially movable drum, guide means for delivering a ribbon from said rollers to said drum, means to engage said ribbon as it is wound on said drum to effect axial movement of the drum, and means to tilt said shaft to disengage said ribbon from said last named means.

5. In an apparatus of the character described, a rotatable head, a plurality of rollers carried by said head and defining a polygonal aperture, a lever, a second head carried by said lever, a like number of rollers supported by said lever and defining a similar aperture, and a shaft supported by said rollers, said shaft having flat faces in contact with said rollers.

6. In an apparatus of the character described, a rotatable drum, means to feed a wire to said drum, means to engage said wire as it is wound on said drum to effect axial movement of the drum, a shaft supporting said drum, and a weighted bell crank lever having one end engaging one end of said shaft to oppose axial movement of said drum.

7. An apparatus for making filter units comprising co-acting conical rollers for converting a wire into a ribbon of definite curvature about an axis perpendicular to its wide faces, means for rotating said rollers, one of said rollers being provided with grooves for forming transverse ribs on one face of the ribbon, means for supporting a drum, a guide tube for delivering to said drum ribbon discharged from said rollers, and means for rotating said drum supporting means to wind said ribbon on edge around said drum in a closed helix.

8. An apparatus for making filter units comprising co-acting conical rollers for converting a wire into a ribbon of definite curvature about an axis perpendicular to its wide faces, means for rotating said rollers, one of said rollers being provided with grooves for forming transverse ribs on one face of the ribbon, means for supporting a drum, a guide tube for delivering to said drum ribbon discharged from said rollers, means for rotating said drum supporting means to wind said ribbon on edge around said drum, and means to engage one face of the ribbon as it is wound on the drum to close the turns and effect axial movement of the drum.

9. An apparatus for making filter units comprising co-acting conical rollers for converting a wire into a ribbon of definite curvature about an axis perpendicular to its wide faces, means for rotating said rollers, one of said rollers being provided with grooves for forming transverse ribs on one face of the ribbon, means for supporting a drum, a guide tube for delivering to said drum ribbon discharged from said rollers, and friction means for rotating said drum supporting means to wind said ribbon on edge around said drum in a closed helix.

10. An apparatus for making filter units comprising co-acting conical rollers for converting a wire into a ribbon of definite curvature about an axis perpendicular to its wide faces, means for rotating said rollers, one of said rollers being provided with grooves for forming transverse ribs on one face of the ribbon, means for supporting a drum, a guide tube for delivering to said drum ribbon discharged from said rollers, friction means for rotating said drum supporting means to wind said ribbon on edge around said drum, and means to engage one face of the ribbon as it is wound on the drum to close the turns and effect axial movement of the drum.

11. An apparatus for making filter units comprising co-acting conical rollers for converting a wire into a ribbon of definite curvature about an axis perpendicular to its wide faces, means for rotating said roller, one of said rollers having provision for forming transverse ribs projecting from one face of said ribbon, means for supporting a drum, a guide tube for delivering to said drum ribbon discharged from said rollers, means for rotating said drum supporting means to wind said ribbon on edge around said drum, a finger engaging one face of said ribbon to close the turns thereof and to effect axial movement of said drum and yieldable means opposing axial movement of said drum.

12. An apparatus for making filter units comprising co-acting conical rollers for converting a wire into a ribbon of definite curvature about an axis perpendicular to its wide faces, means for rotating said roller, one of said rollers having provision for forming transverse ribs projecting from one face of said ribbon, means for supporting a drum, a guide tube for delivering to said drum ribbon discharged from said rollers, friction means for rotating said drum supporting means to wind said ribbon on edge around said drum, a finger engaging one face of said ribbon to close the turns thereof and to effect axial movement of said drum, and yieldable means opposing axial movement of said drum.

In testimony whereof, I have signed my name to this specification.

ROBERT P. F. LIDDELL.